A. H. RAU.
Lawn-Mower.

No. 207,066. Patented Aug. 13, 1878.

Witnesses:
E. Pallen.
Edward Osborn

Inventor:
Adolph H. Rau
By C. W. M. Smith
his Atty.

UNITED STATES PATENT OFFICE.

ADOLPH H. RAU, OF SAN FRANCISCO, CALIFORNIA, ASSIGNOR OF ONE-THIRD HIS RIGHT TO D. SCHILLING, OF SAME PLACE.

IMPROVEMENT IN LAWN-MOWERS.

Specification forming part of Letters Patent No. 207,066, dated August 13, 1878; application filed April 12, 1878.

*To all whom it may concern:*

Be it known that I, ADOLPH H. RAU, of the city and county of San Francisco, State of California, have invented certain new and useful Improvements in Lawn-Mowers, which invention is fully set forth and described in the following specification and accompanying drawings.

My invention has for its object to produce a simple-acting and cheaply-constructed lawn-mower in which the operative gearing is located beneath the frame in such manner that it cannot become choked or clogged.

The invention consists in combining, in a hand lawn-mower, a solid platform having fingers at its front edge and provided with means to connect it with the propelling-handle, an axle journaled in bearings on the under side of such platform and supported at its ends on rollers, the cog-wheel gearing situated entirely beneath the platform and connected with the axle, and the revolving knife operated by the gear and moving over the top of the platform and fingers.

Figure 1:
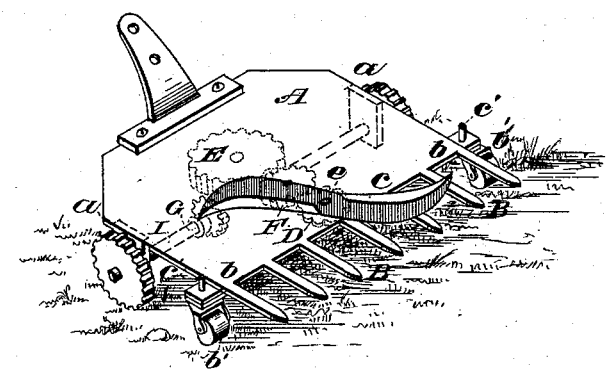
Figure 2:
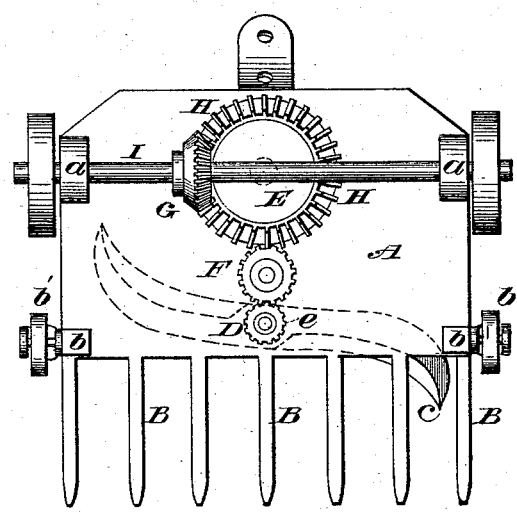

In the accompanying drawing, to which reference is made, Figure 1 is a perspective view of the machine without the propelling-handle. Fig. 2 is a plan view of the under side of the machine, showing the driving-gear.

The frame consists of the solid platform A, provided with bearings $a\ a$ for the axle and $b\ b$ for the casters or supporting-wheels $b'$, and with a tongue to receive the handle. At the front of the platform are the fingers B B, formed in one piece with it or made separate and fixed thereto, and behind the row of fingers upon the platform is located the rotary cutter C with scythe-shaped cutting-edges. The casters $b'\ b'$ at the front of the platform are made adjustable by means of the nuts $c'\ c'$, so that the height of the front edge of the platform and the guard from the ground can be regulated and the distance of the cutter from the ground easily adjusted.

The vertical shaft $e$ extends through the platform, and has a pinion, D, fixed to its lower end, with which the spur-wheel E is connected by the intermediate gear F; and motion is given to these from the axle I by means of the bevel-pinion G and the bevel-gear H in the wheel E. Thus the forward movement of the machine produces a forward rotation of the axle and the rotation of the cutter in the proper direction to cut the grass held between the guards and fingers.

The advantages of my improvement, as will be noticed, are due to the fact that all the operating mechanism is placed entirely beneath the platform, where there is no danger of the gear becoming choked or clogged with grass, as always happens where the train of gear or any part of it is situated above the platform or in proximity to the cutters, and also in the solid platform, which entirely separates the cutter from the gear and prevents the possibility of the grass which lodges upon it falling through and clogging the operative mechanism.

Having thus described my invention, what I claim as new, and desire to secure by Letters Patent, is—

A lawn-mower wherein are combined a solid platform, A, having fingers B, an axle, I, journaled in bearings on the under side of such platform and provided with supporting-rollers at its ends, the gear-wheels situated entirely beneath such platform and connected to the said axle, and the revolving knife C, operated by such gear and moving over the top of the platform and fingers, whereby the gear is prevented from becoming choked or clogged, substantially as and for the purpose set forth.

In testimony that I claim the foregoing I have hereunto set my hand and seal this 22d day of March, 1878.

ADOLPH H. RAU. [L. S.]

Witnesses:
 EDWARD E. OSBORN,
 CHAS. E. KELLY.